(12) United States Patent  
Barr

(10) Patent No.: US 9,107,384 B2
(45) Date of Patent: Aug. 18, 2015

(54) SMALL ANIMAL LITTER CONTAINER

(71) Applicant: Dorothea Dianna Barr, Dumfries, VA (US)

(72) Inventor: Dorothea Dianna Barr, Dumfries, VA (US)

(*) Notice: Subject to any disclaimer, the term of this patent is extended or adjusted under 35 U.S.C. 154(b) by 39 days.

(21) Appl. No.: 14/155,901

(22) Filed: Jan. 15, 2014

(65) Prior Publication Data

US 2014/0196669 A1    Jul. 17, 2014

Related U.S. Application Data

(60) Provisional application No. 61/752,794, filed on Jan. 15, 2013.

(51) Int. Cl.
*A01K 1/01* (2006.01)

(52) U.S. Cl.
CPC ...................... *A01K 1/0107* (2013.01)

(58) Field of Classification Search
CPC .................................................... A01K 1/0107
USPC ................ 119/416, 482, 491, 498, 161, 165; 222/142.2, 142.7–142.8; 220/4.21, 220/676, 661
See application file for complete search history.

(56) References Cited

U.S. PATENT DOCUMENTS

| | | | |
|---|---|---|---|
| 2,827,222 A * | 3/1958 | Buttery | 229/101 |
| 5,065,702 A | 11/1991 | Hasiuk | |
| 5,558,041 A * | 9/1996 | Fairall et al. | 119/165 |
| 5,713,302 A | 2/1998 | Walter | |
| 6,332,429 B1 | 12/2001 | Gramlich | |
| 7,150,242 B2 | 12/2006 | Schuster et al. | |
| 8,191,509 B2 | 6/2012 | Fountain et al. | |
| 2005/0115509 A1 | 6/2005 | Rudolph | |

OTHER PUBLICATIONS

Best Cat Litter Boxes Roundup (apartmenttherapy.com).
Pet Studio MDF Litter Box Cat Cabinet (Amazon.com).
Modern Cat Large Litter Box Hider (moderncatdesigns.com).

* cited by examiner

*Primary Examiner* — Rob Swiatek
*Assistant Examiner* — Danielle Clerkley

(57) ABSTRACT

A small animal litter container is provided with an enclosed design that keeps animal elimination products contained within the litter material and/or the container without leakage and avoids spillage of these materials beyond the container. Cylindrical telescoping interior and exterior housing sections engage to form a covered elimination area within the container. A corresponding keyhole-type of opening in each housing section aligns when the housing sections are engaged to form an animal access door with a unique angled shape that guides an animal to the inside elimination area. A base housing section is formed with a circular cross-section unitary wall with a height that effectively captures and contains all products of elimination without leakage or spillage beyond the container. The present small animal litter container may be used effectively by all kinds of pets, including cats and dogs, whether they exhibit typical or atypical elimination behaviors or habits.

20 Claims, 3 Drawing Sheets

SMALL ANIMAL LITTER CONTAINER

PRIORITY CLAIM

This application claims priority from U.S. Provisional Patent Application No. 61/752,794, filed Jan. 15, 2013, the disclosure of which is fully incorporated herein.

TECHNICAL FIELD

The present invention relates generally to pet animal litter containers and specifically to a litter container designed to enable pet animals with a range of elimination behaviors to use the container so that elimination products are retained within the container.

BACKGROUND OF THE INVENTION

A large number of people in the United States and other countries keep small animals, including cats, as pets. Many, if not most, of these pets live indoors with their owners and rarely, if ever, go outside. The main solution to the problem of providing a location for such pets to deposit feces, the products of elimination remaining after food has been digested, and urine has been the litter box. Over the years since this solution was first introduced, a wide array of litter box options has become available to pet owners. Available litter materials used in these litter boxes as a medium where an indoor pet can deposit its elimination products have changed as well. Despite the changes, however, pet owners continue to search for a litter box that effectively contains pet elimination products with minimal or no odor, that is easy to clean, that is at least somewhat unobtrusive to human occupants of the space where it is located, and that the pet will actually use.

The variety of types and sizes of animal litter containers available for a pet owner in need of such a product may be rather overwhelming. The 22 Jan. 2013 issue of apartmenttherapy.com, for example, presented a "Best Cat Litter Boxes Roundup" with a range of litter box designs, some of which incorporate a pan of litter into what is essentially a piece of furniture. Pet supply stores, such as PetCo and PetSmart, also offer a wide range of litter containers, from a very basic open top rectangular pan that holds litter material to covered boxes and enclosed domes and other shapes that at least partially conceal the litter material from view.

In addition to the great variety of commercially available animal litter containers noted above, an extensive variety of pet and animal litter containers is also described in the United States patent art. U.S. Pat. No. 5,065,702 to Hasiuk; U.S. Pat. No. 5,713,302 to Walter; and U.S. Pat. No. 6,332,429 to Gramlich, for example, all disclose variations of enclosed litter containers. U.S. Patent Application Publication No. US2005/0115509 to Rudolph and U.S. Pat. No. 7,150,242 to Schuster et al and U.S. Pat. No. 8,191,509 to Fountain et al all disclose examples of open top animal litter boxes. While these designs represent attempts to solve specific litter container issues, such as the scattering of litter material, none provides a litter container for a range of small pet animals with a variety of different elimination behaviors and habits that minimizes inconvenience to pet owners.

Most litter containers emphasize that they are easy to clean; the actual ease of cleaning is relative, however. To maintain a litter container in a sanitary condition, which is as essential for the pets as it is for the humans they live with, litter must be cleaned and changed at regular intervals. The extent of the cleaning usually depends on the kind of litter material used and the number of pets using the litter box. At some point, all of the litter must be changed, and the container sanitized. Maintaining a clean litter container can be challenging for the owners of cats or other pets that exhibit typical elimination behavior when urine and/or feces are deposited only on the litter material within the litter container. Maintaining a clean litter container can be especially challenging, however, when a pet exhibits atypical elimination behavior or the pet differs in other ways from the "standard" pet for which the litter container was designed. In these situations, this atypical pet may, for whatever reason, deposit elimination products outside the container or inside the container in locations other than on the litter. Both cases require additional work by the pet owner to clean and sanitize not only the litter container, but also the area around the container.

Cats, the primary pet animal users of litter containers, may not only exhibit atypical elimination behavior, but are also notoriously selective about using particular kinds of litter containers. Although an open top rectangular type of litter container may be used willingly by many cats, it is not aesthetically pleasing to many cat owners. In addition, if a cat that uses this type of litter container changes its elimination behavior, for example as a result of illness or old age, spillage of feces and urine with the odor and mess that accompanies this outside the litter container is likely. Cat owners confronted with the spillage of elimination products may replace the open top litter container with an enclosed type of litter container, such as one of the types of enclosed litter containers shown and described in the Hasiuk, Walter, and Gramlich patents or the apartmenttherapy.com publication noted above. One of the currently available enclosed litter container designs may work well for pets that exhibit typical or standard elimination behavior. Such enclosed litter containers may seem to be a solution to a pet's atypical elimination behavior that results in elimination products spreading beyond an open litter container. Most of the available enclosed litter container designs, however, may be too physically confining or restrictive for many pets to use effectively. Additionally, the available enclosed litter containers do not effectively accommodate a range of cats or other small animals that vary from the typical animal in size, shape, and age, as well as in elimination behavior and habits.

There is a need, therefore, for a pet litter container designed to accommodate the needs of litter container-using small animals of varied sizes, shapes, and ages, as well as varied elimination behaviors and habits that also accommodates the needs of pet owners for an attractive, easily sanitized litter container that captures and contains animal elimination products within the container.

SUMMARY OF THE INVENTION

It is a primary object of the present invention, therefore to provide a pet litter container designed to accommodate the needs of litter container-using pets of varied sizes, shapes, and ages, as well as varied elimination behaviors and habits that also accommodates the needs of pet owners for an attractive, easily sanitized litter container that captures and contains animal elimination products within the container.

It is another object of the present invention to provide a pet litter container that prevents the spillage of elimination products beyond the container as an animal is using the container.

It is an additional object of the present invention to provide a pet litter container that effectively captures within the container elimination products from a range of pet animals that exhibit a wide variety of different elimination behaviors.

It is a further object of the present invention to provide an enclosed pet litter container with an entryway specifically shaped to encourage and guide an animal trained to use the container into an elimination area within the container.

It is yet another object of the present invention to provide a pet litter container that is attractive to cats, particularly aging cats and cats that exhibit atypical urination or elimination behavior.

It is yet another object of the present invention to provide an enclosed pet litter container with a design that captures and contains urine and other elimination products deposited by the pet outside a supply of litter material without leakage or spillage.

It is yet an additional object of the present invention to provide an enclosed pet litter container with a two part construction that disassembles easily for cleaning and sanitizing.

It is yet another object of the present invention to provide an enclosed pet litter container that is designed and sized to be used effectively by multiple cats or other pets.

It is yet a further object of the present invention to provide a pet litter container that is aesthetically pleasing and may be adapted to appear and/or function as a piece of furniture in an interior space.

It is still another object of the present invention to provide a pet litter container that may, alternatively, be used as a pet bed or a pet play area.

In accordance with the aforesaid objects, a pet litter container is provided that is designed to be attractive to and easily accessible to a pet animal using the container and that is capable of accommodating the needs of litter container-using small animals of varied sizes, shapes, and ages, as well as varied elimination behaviors and habits. The structure of the present pet litter container keeps animal elimination products contained within the litter material and/or the container without leakage and avoids spillage of these materials beyond the container. The present litter container is an enclosed design with a substantially cylindrical configuration formed by a base housing section or interior shell that telescopes within an upper housing section or exterior shell to form a covered elimination area within the container. Each housing section is provided with a notch or keyhole-type of opening configured to form an access door that allows an animal access to the elimination area inside the container when the base housing section is telescoped into the upper housing section so that the respective openings register and are aligned. The angled configuration of the access door is specifically designed to encourage the animal to enter the container and guides the animal into the elimination area. The base housing section or interior shell is formed with a unitary wall that is preferably circular is cross-section having a height that effectively captures and contains all products of elimination without leakage or spillage beyond the container. The pet animal litter container of the present invention is designed to be used effectively by one or more of a number of kinds of small pets, including cats and dogs, whether they exhibit typical or atypical elimination behaviors or habits.

Other objects and aspects of the pet litter container of the present invention will become apparent from the following description, drawings, and claims.

DESCRIPTION OF THE INVENTION

Figure 1:
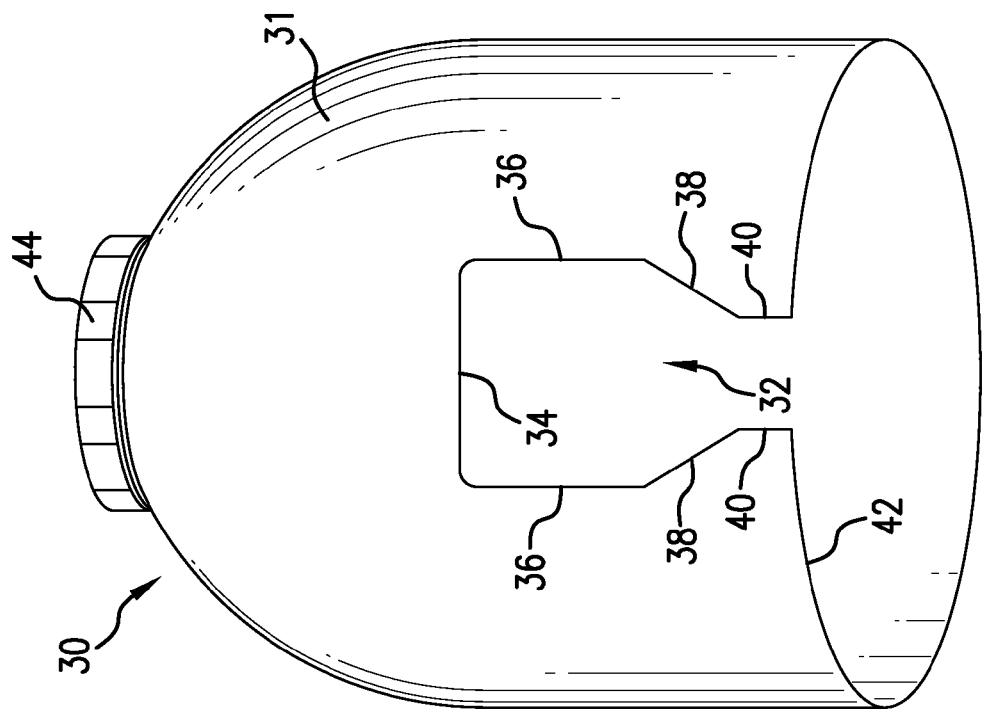
FIG. 1 is a diagrammatic illustration of a base housing section of the pet litter container of the present invention.

As noted above, litter containers currently available for pet animals do not satisfy the needs of pet owners for a litter container able to accommodate pets with a variety of different elimination behaviors. While the available litter containers may be used successfully with many pets, there is currently no single litter container design that effectively provides an indoor location where virtually any small animal can deposit its urine and feces without these products spilling or leaking beyond the litter container to pose cleaning and other challenges for the pet owner. All pets have unique physical and behavioral characteristics that produce a wide range of results in a litter box elimination area. Pets may be tall or short, old or young, male or female, as well as playful or serious, and these traits tend to influence elimination behavior and habits. Pets with behavior that may be atypical or non-standard come in all shapes, sizes, and attitudes. These pets may approach the process of depositing their elimination products in a litter container in very different observable ways. Cats, in particular, although sometimes dogs as well, may be described as high shooters, sprayers, squatters, diggers, kickers, and organizers according to their approach to depositing urine and/or feces in litter material in a litter container elimination area. The designs of most available litter containers, intended for use by animals that exhibit typical or standard elimination behavior in a litter container, do not effectively and consistently capture and contain the elimination products of the aforementioned atypical or non-standard small pets. Consequently, these elimination products are not contained by, but are deposited beyond, the litter container. Pet owners love and enjoy their pets, but having to clean the environment surrounding the litter container when this occurs on a regular basis is not an enjoyable task.

The design of the pet litter container of the present invention effectively and consistently captures the elimination products of a wide range of small animals capable of using a litter container, regardless of the animal's elimination behavior or habits or other traits so that there is no leakage or spillage of elimination products beyond the container into the surrounding environment. The present litter container design employs an arrangement of two telescoping housing sections to define an enclosed litter container with a generally cylindrical shape with an elimination area. Corresponding openings in each of the two housing sections are configured to provide an access doorway with an angled shape that effectively directs and guides an animal entering the container to the elimination area within the container when the openings are aligned. Not only does this design, which is discussed in greater detail below, capture and contain an animal's elimination products entirely within the container, but it is also not physically confining or restricting to the animal like most enclosed litter containers. Additionally, the litter container design of the present invention is intended to accommodate use by multiple cats or other pets that may display different elimination behaviors or habits.

Figure 2:
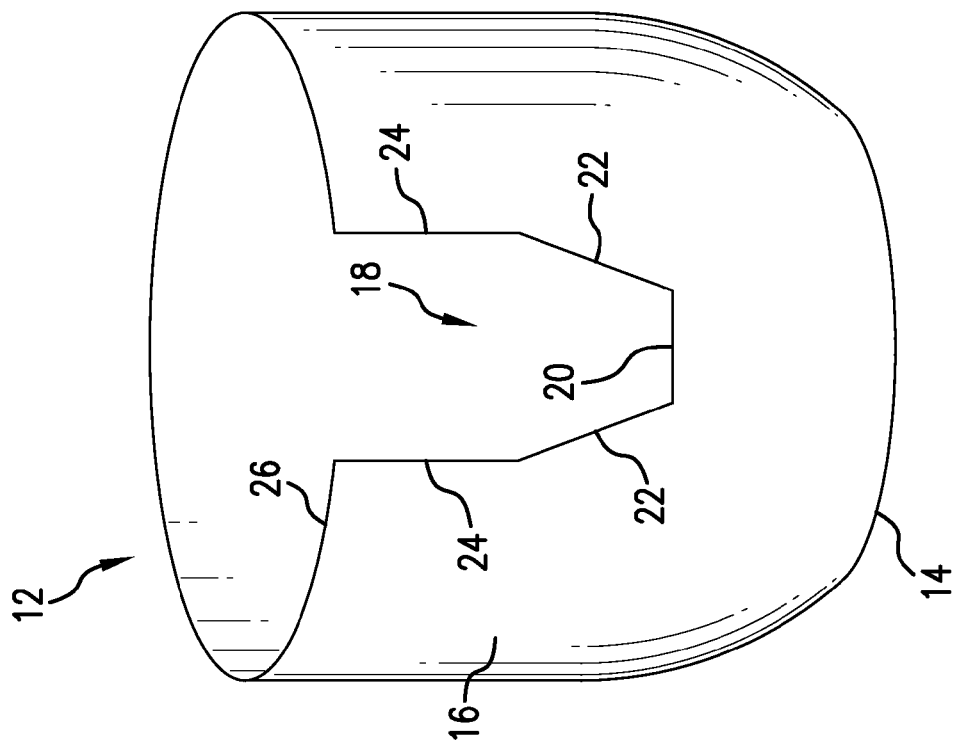
FIG. 2 is a diagrammatic illustration of an upper housing section of the pet litter container of the present invention.
Figure 3:
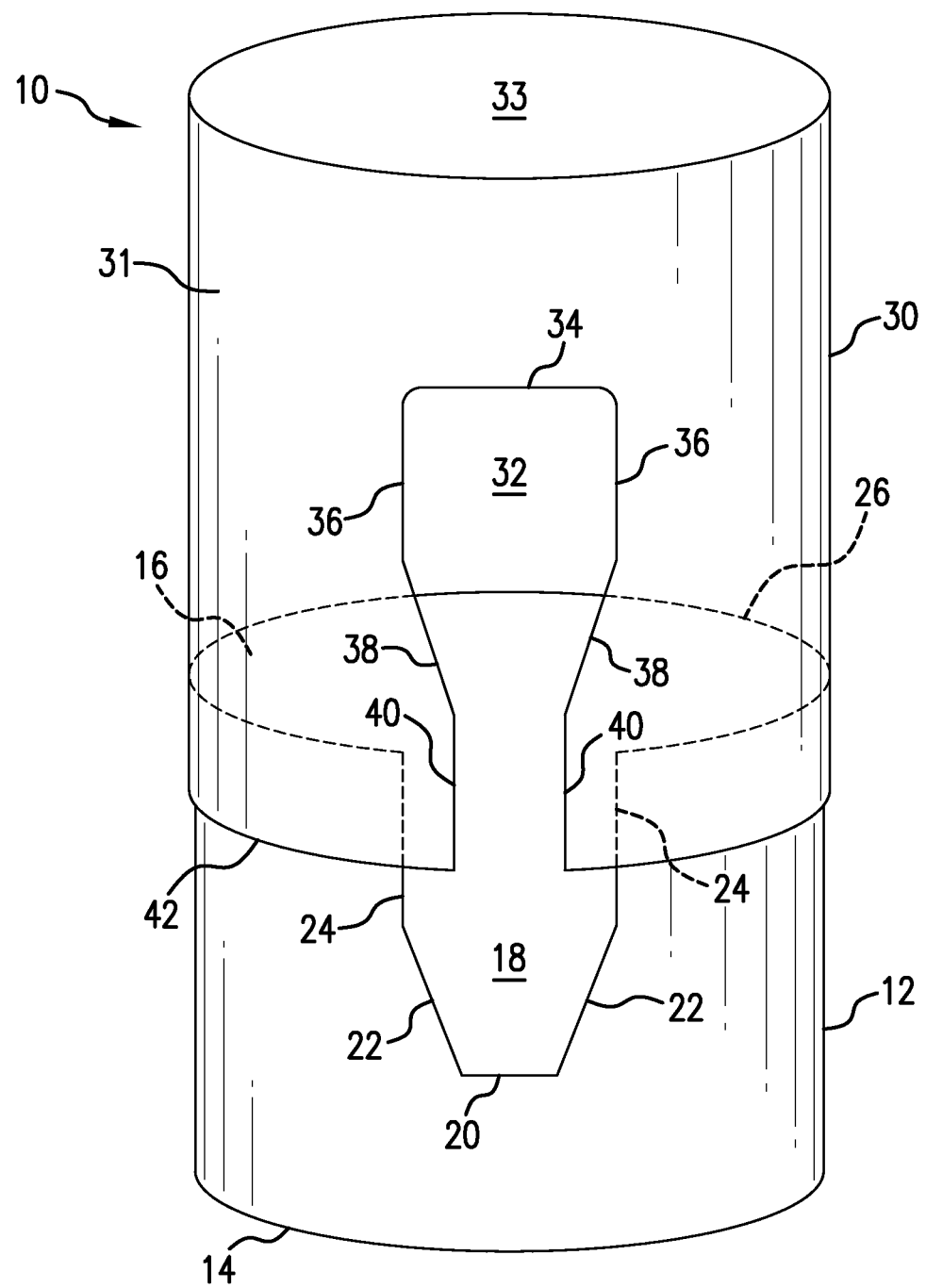
FIG. 3 is a diagrammatic illustration of the pet litter container of the present invention showing the base housing section in the process of telescoping into the upper housing section and the relative positions of specifically configured angled openings in each housing section that will form an access doorway when the pet litter container is fully assembled.

Referring to the drawings, which may not be drawn to scale, FIGS. 1 and 2 illustrate diagrammatically each of the individual telescoping housing sections that form the present litter container, and FIG. 3 illustrates these housing sections in the process of assembly to form a litter container 10. While the overall shape of these housing sections and the entire litter container may be that shown in the drawings and are generally capsule-shaped or cylindrical with a substantially circular cross-section, other similar shapes that may be arranged to function as described herein are also contemplated to be within the scope of the present invention.

FIG. 1 illustrates a base housing section or interior shell portion 12 of the litter container 10. The base housing section 12 includes a base 14 that may be shaped to support the litter container on a flat surface, such as a hard floor or a smooth carpet. Extending away from the base 14 is a generally cylindrical unitary wall 16 that has a circular cross-section. The base 14 and the wall 16 may be formed integrally or may be formed of two separate components secured together to form a leak proof joint. Illustrative dimensions of the housing sections are discussed below. The height of the unitary wall 16 above the base 14 will preferably be selected so that the wall 16 extends a sufficient distance above the base 14 to capture and contain urine deposited within the container by an animal that tends to "shoot" or spray urine during elimination.

A notch opening 18 is provided at a selected location in the wall 16. The notch opening 18 preferably has the angled shape shown, which is designed to register with a corresponding opening in a second housing section to form a pet access doorway as described below and shown in FIGS. 3, 4, and 5. Other corresponding and/or cooperating notch or keyhole configurations for openings that may be aligned to provide a pet access doorway to function as described herein are also contemplated to be within the scope of the present invention. The notch opening 18 may have a horizontal bottom edge 20 that is parallel to the base 14 and spaced a selected distance above the base 18. The actual distance will depend on the dimensions of the container 10. The remainder of the notch opening 18 is defined by two opposed angled edges 22 that are separated by a distance that is preferably greater than the length of the bottom edge 20. The angled edges 22 of the notch opening 18 are connected by two opposed parallel edges 24 to an upper edge 26 of the wall 16. The parallel edges 22 are substantially perpendicular to the base 14 and the bottom edge 20. The distance between the bottom edge 20 of the opening 18 and the upper extent or top edge of the wall 16 may vary and will be selected to depend on the overall size of the litter container 10, as well as the size of a pet animal to be accommodated by the container. Similarly, the length of the horizontal bottom edge 20, and the distances between the angled edges 22 and the parallel edges 24 of opening 18 may also vary, depending on the size of the container as well as the size of an animal that will use the container.

FIG. 2 illustrates an upper housing section or exterior shell 30 portion of the litter container 10. The upper housing section shown has a slight dome or capsule shape, but a cylinder or other shape, as shown in FIG. 3, could also be used to form the upper housing section or exterior shell 30. The upper housing section includes a keyhole or notch opening 32 in a wall 31 of the housing that is shaped to correspond to the angled shape of the notch opening 18 shown in FIG. 1 so that the registration or alignment of the two openings 18 and 32 forms an angled access doorway or entryway 50 (FIGS. 4 and 5) into the interior for a pet using the litter container. The opening 32 has an upper horizontal edge 34, two opposed parallel edges 36 connected to and perpendicular to the edge 34, and opposed angled edges 38 that are separated by a distance that may be less than the distance separating the parallel edges 36. A second pair of opposed parallel edges 40, which are preferably separated by a distance that is less than the distance between the angled edges 38, connects the angled edges 38, the parallel edges 36, and the upper horizontal edge 34 to an outer downward extent or bottom edge 42 of the upper housing section or exterior shell 30. A support element 44 may be provided at an outermost extent or top of the upper housing 30 to support a table top or other functional element, as shown and discussed in connection with FIG. 5.

FIG. 3 illustrates the two housing sections of the litter container 10, which is shown to have the shape of a regular cylinder, in the process of assembly. The base housing section or interior shell 12 is designed to slide or telescope into the upper housing section of exterior shell 30. To facilitate this process, the diameter of the interior shell 12 may be slightly smaller than the diameter of the exterior shell 30. The interior shell 12 is slid into the exterior shell 30 until the edge 42 of the exterior shell reaches the base 14 of the interior shell 12. The angled edges 22 of the interior shell opening 18 will then align with the angled edges 38 of the exterior shell opening 32. The perpendicular edges 24 of the interior shell opening 18 will align with the perpendicular edges 36 of the exterior shell opening 32. The horizontal edge 34 of the exterior shell opening 32 will be positioned to be coextensive with the upper edge 26 of the unitary wall 16 of the interior shell 12 to bridge the gap in the wall 16 where the parallel edges 24 of the notch opening 18 intersect with the edge 26 of the wall 16. This is shown more clearly in FIG. 4. Disassembly of the housing sections of the litter container is easily accomplished by sliding the upper housing section or exterior shell 30 away from the base 14 of the interior shell 12 to separate these components. Separation of the two housing sections provides access to the interior shell, which may hold a supply of litter material as described below, when a thorough cleaning of the container is needed or for any other purpose.

Figure 4:
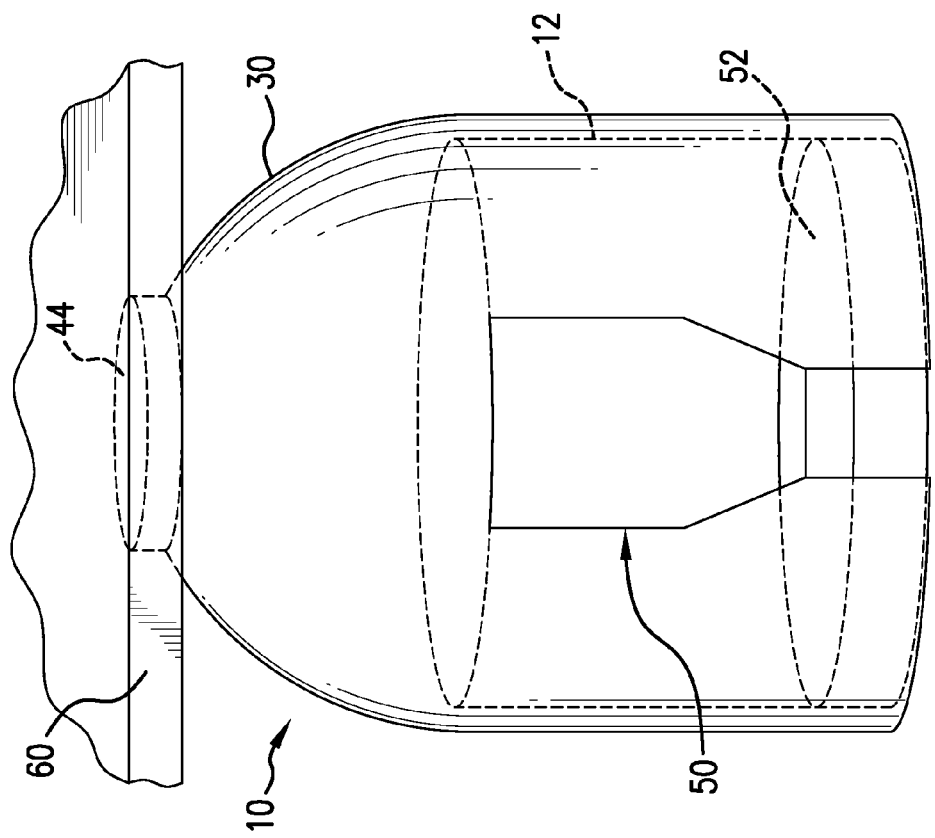
FIG. 4 is a diagrammatic illustration of a fully assembled pet litter container in accordance with the present invention showing the base housing section completely telescoped into the upper housing section to form an elimination area and the access doorway formed when the opening in the base housing section is aligned with the corresponding opening in the upper housing section.

FIG. 4 illustrates the fully assembled components of the pet litter container 10 of the present invention. The embodiment of the litter shown in FIG. 4 has an upper housing section 30 with a capsule-type configuration as shown in FIG. 2. As noted above, the base housing section or interior shell 12 may have a slightly smaller diameter than the diameter of the upper housing section or exterior shell 30 so that the interior shell 12 may slide into the exterior shell 30 or, similarly, so that the upper housing section 30 may be slid into place over the base housing section 12 more easily. When the two housing sections are telescoped together, they may also be rotated so that the notch opening 18 in the interior shell 12 aligns with the keyhole opening 32 in the exterior shell 30, as described in connection with FIG. 3 to form a pet access doorway 50 that allows an animal to enter the litter container 10. An elimination area 52, indicated in dashed lines in FIG. 3, may be provided, preferably on top of the base 14, in the base housing section or interior shell 12. A suitable leak proof liner 56 selected to fit within the elimination area 52 that is designed to hold a supply of litter material 54 may be provided to facilitate cleaning of the elimination area.

The unique configuration of the pet access doorway 50 not only encourages and guides an animal's entry into the litter container, but the angled shape of the doorway 50 is also functions to keep elimination products within the container and to prevent spillage beyond the container. The height of the wall 16 of the base housing section or interior shell 12 may also be selected to maximize the capture and containment of feces and urine while an animal is using the litter container.

The present pet litter container is especially suitable for small animals, and its primary use is likely to be for cats and small dogs. It may, however, also be used for other small animals, such as ferrets, rabbits, and other mammals kept as pets that can be trained to eliminate in a litter container. The present container is also suitable for use by multiple pets.

By way of example without limitation, illustrative dimensions of the components of the present pet litter container that will accommodate the needs of a range of small animals with a variety of elimination behaviors and habits are included herein. For example, the base housing section or interior shell 12 may have a diameter of about 26 inches, with a height of wall 16 from the base 14 to the edge 26 of about 18-20 inches. The upper housing section or exterior shell 30 may also have a diameter of about 26 inches, but can be slightly larger than the actual diameter of the base housing section to allow the two components to slide together and apart easily during assembly and disassembly of the container. The maximum height of the wall 31 of the upper housing section 30 may be about 28-30 inches. One preferred set of dimensions of the pet access doorway 50 ranges from about 3-7 inches for the horizontal bottom edge 20 to about 7-11 inches for the upper horizontal edge 34. The bottom edge 20 of the notch opening 18 may be positioned about 7 inches above the base 14 as it rests on a floor. It will be appreciated that a litter container with the foregoing dimensions will be a structure that is larger than most available pet litter containers. A litter container of this size more effectively accommodates a varied range of small animals with varied elimination behaviors and habits and, additionally, works well as a single elimination location for multiple pets. Unlike available enclosed litter containers, which many pets, especially cats, will not use because these animals do not tolerate small confined spaces well, the litter container of the present invention avoids this problem and provides an ample elimination area for even the fussiest of cats. These specific dimensions are not intended to be limiting, but are merely illustrative and may be varied as desired to produce a litter container sized to comfortably accommodate smaller or larger pets.

It is preferred that the litter container of the present invention be made of a nonporous plastic material that will not retain odors. In one aspect of the invention, an existing plastic cylindrical, drum-shaped, or capsule-shaped container may be used to form the litter container. The base housing section or interior shell and the upper housing section or exterior shell components may be made by cutting the existing container to the dimensions noted above or to other desired dimensions, cutting the openings 18 and 32 to have the angled configurations and relative dimensions described, and sliding the components together or collapsing the exterior shell onto the interior shell. The openings may also be cut after the housing sections or shells have been slid together.

Various modifications may be made to the litter container, and such modifications are contemplated to be within the scope of the present invention. For example, without limitation, the upper housing section or exterior may be sculpted and/or decorated to enhance aesthetic appeal of the container. Casters or wheels could be attached to the base 14 to facilitate mobility and relocation of the litter container. A pet access entryway may also be located on the top of the container, such as on surface 33 of the cylindrical container shown in FIG. 3 to provide an alternative pet access to the access doorway 50 in the container vertical walls. Other access doorways in different locations likely to used by pets may also be provided. Ventilation holes may be added to allow air to flow into the container to ensure ventilation, particularly in the event the housing sections were rotated so that the pet access doorway 50 becomes closed and is not available to an animal inside the container.

To use the present pet litter container, a pet owner would simply fill the liner 56, if used, in the elimination area 52 in the interior shell or base housing section with a quantity of a supply of a type of litter material 54 appropriate for a small pet and then slide the exterior shell or upper housing section over the interior shell so that the openings 18 and 32 are aligned. If desired to assist pet owners with cleaning the litter container, especially when the litter material is scooped from the access door 50, the interior of the base housing section could be provided with lighting (not shown), which may be in the form of a battery powered LED light or lights installed in interior locations to aid visibility during cleaning of the elimination area 52. Filters (not shown) could also be added to the litter container to ensure odor absorption and containment and/or to provide a pleasing fragrance to the container. When the litter container is ready for use, a pet owner may introduce the pet to the container. Two or three introductions may be necessary before the pet accepts the litter container and begins to use it, although this may vary for different pets.

Figure 5:
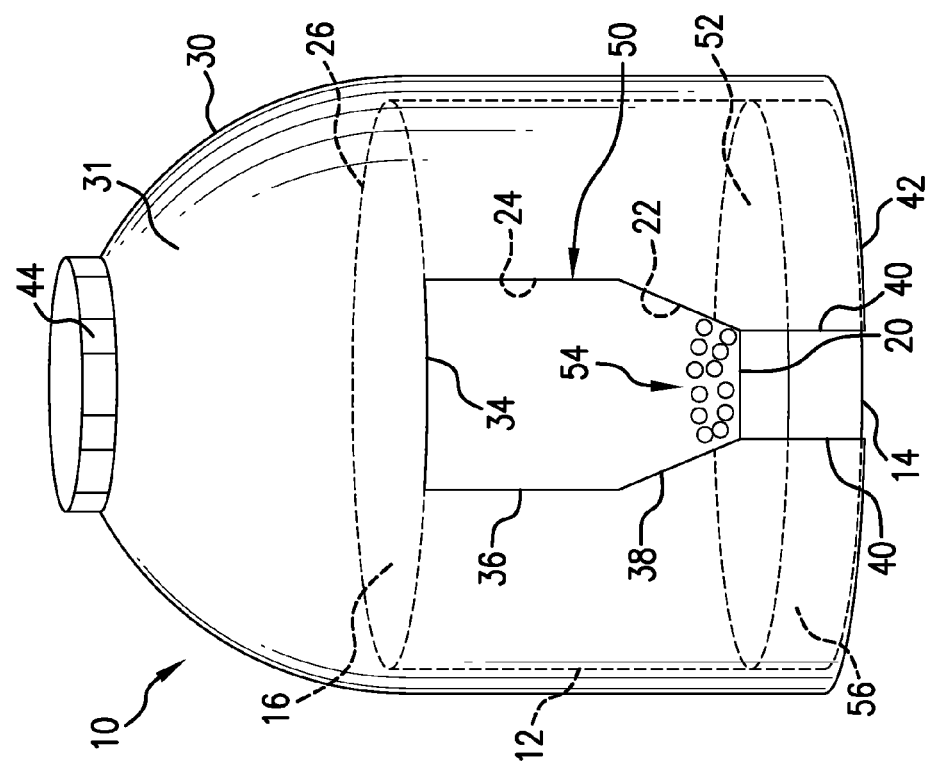
FIG. 5 illustrates the use of the present pet litter container structure as a base for a table.

FIG. 5 illustrates one potential additional use of the pet litter container of the present invention. The support 44 on the exterior of the upper housing section 30 has been adapted to engage and support a table top 60, increasing the utility of the container. The exterior of the litter container 10 could also be decorated to appear more like a table base or a piece of furniture. Instead of filling the interior shell with a liner holding a supply of litter material, a pet bed 62 could be installed on the base 14 in its place to provide an animal sleeping area. Alternatively, depending on the dimensions selected, the area inside the container may be used as a pet play area. Other uses are possible and are contemplated to be within the scope of the present invention.

While the present invention has been described with respect to preferred embodiments, this is not intended to be limiting, and other arrangements and structures that perform the required functions are contemplated to be within the scope of the present invention.

INDUSTRIAL APPLICABILITY

The small animal litter container of the present invention will find its primary applicability where it is desired to provide an animal litter container that is attractive to a pet animal as well as a litter container that is able to effectively capture and contain animal eliminate products completely within the container while accommodating the elimination behaviors and habits of a wide range of one or more pet animals.

The invention claimed is:

1. A litter container suitable for use by one or more small pets that exhibit a range of elimination behaviors, wherein said litter container comprises:
   a. a first housing section with a base portion adapted to support the housing section on a flat surface connected to a unitary wall that extends upwardly from the base portion to form an outer edge of the first housing section, wherein said unitary wall includes a notch opening extending from said outer edge a selected distance toward the base portion, said notch opening having a first notch dimension at said outer edge and a second notch dimension less than the first dimension at said selected distance;
   b. a second housing section sized to telescopingly receive said first housing section within said second housing section interior, wherein a wall portion of said second housing section includes a keyhole opening extending from an outer edge of said wall portion a selected distance from said wall portion outer edge, said keyhole opening having a first keyhole dimension at said outer edge and a second keyhole dimension greater than the first dimension at said selected distance; and c. when said first housing section is telescopingly received within said second housing section, said notch opening aligns with said keyhole opening to define an angled access doorway configured to direct a pet into an elimination area contained within said telescoped first and second housing sections.

2. The litter container of claim 1, wherein said angled access doorway defined by the alignment of said notch opening and said keyhole opening comprises a six-sided angled opening into said telescoped first and second housing sections.

3. The litter container of claim 2, wherein said notch opening comprises a horizontal base edge with said second notch dimension spaced a selected distance above said first housing section base portion, a pair of angled edges connected to said horizontal base edge extending away from said base portion to connect with a pair of opposed parallel edges spaced apart a distance equal to said first notch dimension extending outwardly of said base portion to connect with said unitary wall outer edge to form a contiguous angled notch opening; and said keyhole opening comprises a horizontal upper edge with said second keyhole dimension connected to a first pair of opposed parallel edges extending toward said wall portion outer edge, said parallel edges are connected to a pair of opposed angled edges extending further toward said wall portion outer edge, and said angled edges are connected to a second pair of opposed parallel edges connected to said wall portion outer edge and spaced apart a distance equal to said first keyhole dimension to form a contiguous angled keyhole opening; wherein the alignment of said contiguous angled notch opening and said contiguous angled keyhole opening defines said six-sided angled access doorway.

4. The litter container of claim 1, further comprising an elimination area located on said first housing section base portion and adapted to hold a supply of a litter material within said telescoped first and second housing sections.

5. The litter container of claim 4, wherein said first housing section has a cylindrical configuration with a circular cross-section, and said unitary wall is formed integrally with or attached to said base portion to surround said elimination area and is adapted to capture and contain products of elimination deposited by an animal in the elimination area.

6. The litter container of claim 1, wherein each of said first housing section and said second housing section has a substantially cylindrical configuration with a circular cross-section.

7. The litter container of claim 6, wherein each of said first cylindrical housing section and said second cylindrical housing section has a truncated capsule-shaped configuration so that an upper portion of said second cylindrical housing section wall is dome-shaped.

8. The litter container of claim 6, wherein each of said first cylindrical housing section and said second cylindrical housing section has the configuration of a regular cylinder.

9. The litter container of claim 6, wherein a dome-shaped portion of said second housing section comprises a support element adapted to support a planar horizontal surface structure and includes a planar horizontal surface structure supported by said support element to form a table top with said litter container forming a base of said table top.

10. The litter container of claim 1, further comprising a pet bed located in said elimination area.

11. The litter container of claim 1, wherein when said first and second housing sections are telescoped together, said outer edge of said wall portion of said second housing section is positioned adjacent to said base portion of said first housing section.

12. The litter container of claim 2, wherein said six-sided access doorway comprises a horizontal top edge spaced a selected distance from and having a greater length than a parallel horizontal bottom edge, opposed lower side edges angled a selected angle outwardly of said bottom edge, and opposed parallel upper side edges connecting said lower side edges to said horizontal top edge.

13. The litter container of claim 12, wherein said selected distance and said angle are selected to accommodate a range of sizes of small animals to facilitate use of the litter container by said animals.

14. The litter container of claim 1, further comprising positioning a second pet access doorway in a location different from said angled access doorway.

15. The litter container of claim 5, wherein a diameter of the circular cross-section of said first housing section is less than a diameter of a circular cross-section of said second housing section.

16. A litter container designed to accommodate the elimination needs and behaviors of a range of small animals, wherein said litter container comprises a pair of easily assembled and disassembled telescoped cylindrical housing sections, with a lower housing section comprising a base section adapted to support the litter container on a flat surface, an open top, and an angled opening in a wall area of a unitary wall of said lower housing section; an upper housing section comprising a domed or planar top surface, a wall between the top surface and an open bottom end, and an angled opening in said wall; wherein said angled openings in said lower and upper housing sections align when said lower housing section is telescoped within said upper housing section to form an angled access doorway with a lower dimension smaller than an upper dimension configured to guide an animal into the litter container.

17. The litter container of claim 16, wherein said lower housing section interior further comprises an elimination area located adjacent to said base section, and said access doorway guides the animal into the elimination area.

18. The litter container of claim 17, wherein the elimination area comprises a liner element containing a supply of a litter material suitable for use by the animal.

19. The litter container of claim 16, wherein said lower housing section unitary wall is adapted to prevent spillage or leakage of animal elimination products or litter beyond the litter container.

20. The litter container of claim 16, wherein said litter container comprises an enclosed litter container, and said upper and lower housing sections and the angled openings in said upper and lower housing sections have dimensions selected to facilitate access to the elimination area by a range of small animals and to accommodate a wide range of elimination behaviors and habits of said animals while effectively capturing and containing products of animal elimination.

* * * * *